United States Patent
Aoki et al.

(10) Patent No.: US 9,466,333 B2
(45) Date of Patent: Oct. 11, 2016

(54) CONTENT REPRODUCING APPARATUS, CONTENT REPRODUCING SYSTEM, AND CONTENT REPRODUCING METHOD

(71) Applicants: Shinji Aoki, Kanagawa (JP); Junichi Hara, Kanagawa (JP); Shigeyuki Ishii, Kanagawa (JP); Tatsuroh Sugioka, Kanagawa (JP); Tatsuya Nagafuchi, Kanagawa (JP)

(72) Inventors: Shinji Aoki, Kanagawa (JP); Junichi Hara, Kanagawa (JP); Shigeyuki Ishii, Kanagawa (JP); Tatsuroh Sugioka, Kanagawa (JP); Tatsuya Nagafuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/734,046

(22) Filed: Jun. 9, 2015

(65) Prior Publication Data
US 2015/0371682 A1 Dec. 24, 2015

(30) Foreign Application Priority Data
Jun. 19, 2014 (JP) ................ 2014-126226

(51) Int. Cl.
| | | |
|---|---|---|
| *H04N 9/88* | (2006.01) | |
| *G11B 27/22* | (2006.01) | |
| *G11B 27/34* | (2006.01) | |
| *G11B 27/36* | (2006.01) | |
| *G06F 1/32* | (2006.01) | |

(52) U.S. Cl.
CPC ............ *G11B 27/22* (2013.01); *G06F 1/3215* (2013.01); *G06F 1/3296* (2013.01); *G11B 27/34* (2013.01); *G11B 27/36* (2013.01)

(58) Field of Classification Search
CPC ............................ G11B 27/22; G06F 1/3215
USPC .................................................. 386/230, 277
See application file for complete search history.

(56) References Cited

U.S. PATENT DOCUMENTS

| | | | | |
|---|---|---|---|---|
| 7,269,330 | B1 * | 9/2007 | Iggulden ............. | H04H 60/375 348/460 |
| 7,907,219 | B2 * | 3/2011 | Kim ...................... | H04N 5/63 348/729 |
| 2004/0205334 | A1 * | 10/2004 | Rennels ................ | H04H 20/31 713/154 |
| 2006/0020891 | A1 * | 1/2006 | Obara .................. | G06F 1/3215 715/718 |
| 2006/0285024 | A1 * | 12/2006 | Chou ..................... | H04N 5/63 348/790 |
| 2008/0240683 | A1 | 10/2008 | Yamagata et al. | |
| 2009/0106789 | A1 * | 4/2009 | Lee ....................... | H04N 7/163 725/28 |
| 2010/0053302 | A1 * | 3/2010 | Ivashin ................. | H04N 7/147 348/14.08 |
| 2011/0261155 | A1 * | 10/2011 | Tsuruga ............. | H04N 13/0051 348/43 |
| 2013/0011114 | A1 * | 1/2013 | Tashiro ............... | G11B 27/105 386/230 |
| 2013/0022331 | A1 * | 1/2013 | Wu ....................... | H04N 5/76 386/230 |

FOREIGN PATENT DOCUMENTS

| | | |
|---|---|---|
| JP | 2008-250899 | 10/2008 |
| JP | 2009-027458 | 2/2009 |
| JP | 4998726 | 8/2012 |

\* cited by examiner

*Primary Examiner* — Thai Tran
*Assistant Examiner* — Mishawn Hunter
(74) *Attorney, Agent, or Firm* — IPUSA, PLLC

(57) ABSTRACT

A content reproducing apparatus includes a reproducing unit configured to reproduce content including audio and video, and a power control unit configured to perform power control of the reproducing unit based on a reproducing position of the content and non-reproduction period information indicating at least one of a period during which reproduction of the audio of the content is unnecessary and a period during which reproduction of the video of the content is unnecessary.

9 Claims, 8 Drawing Sheets

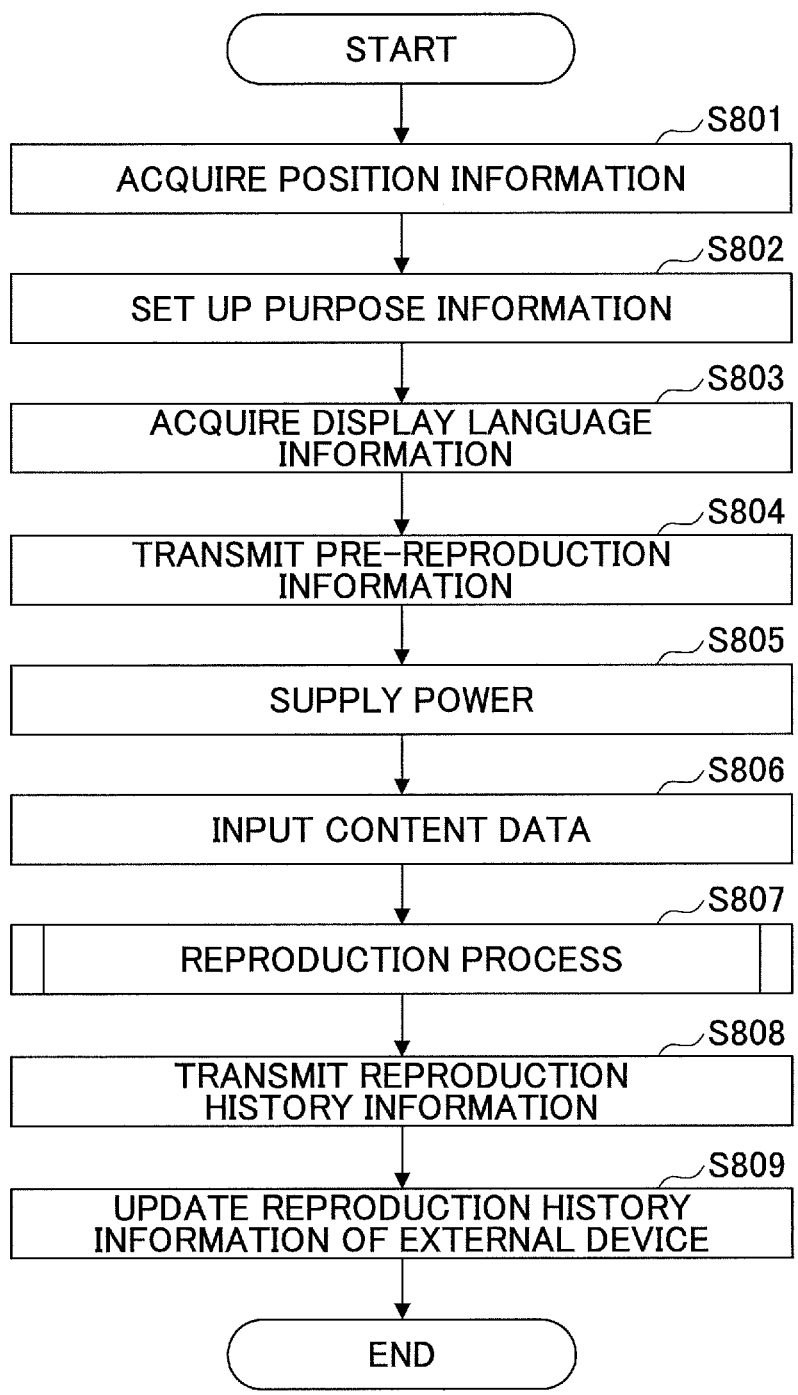

FIG.9

| FILE NAME | REPRODUCTION PURPOSE | POSITION INFORMATION | DISPLAY LANGUAGE | NON-REPRODUCTION PERIOD BASED ON VOLUME | NON-REPRODUCTION PERIOD |
|---|---|---|---|---|---|
| A.mov | IN-HOUSE MEETING | LATITUDE: 135.05454 LONGITUDE: 75.0155 FLOOR: 3 | JAPANESE | VIDEO: 0m00~60m00 | VIDEO: 3m00~5m00 5m00~4m00 AUDIO: |
| A.mov | IN-HOUSE MEETING | LATITUDE: 135.05454 LONGITUDE: 75.0156 FLOOR: 20 | ENGLISH | NONE | 5m00~4m00 |
| B.mpeg | DEMONSTRATION | LATITUDE: 135.05454 LONGITUDE: 75.0156 FLOOR: 20 | JAPANESE | NONE | VIDEO: NONE AUDIO: 5m00~4m00 |
| B.mpeg | PRIVATE | LATITUDE: 135.05454 LONGITUDE: 75.0156 FLOOR: 11 | JAPANESE | NONE | |

CONTENT REPRODUCING APPARATUS, CONTENT REPRODUCING SYSTEM, AND CONTENT REPRODUCING METHOD

BACKGROUND OF THE INVENTION

1. Field of the Invention

The present invention relates to a content reproducing apparatus, a content reproducing system, and a content reproducing method.

2. Description of the Related Art

Multimedia content typically includes video representing visual information and audio representing audible information. Content reproducing apparatuses that reproduce such content may separate the content into video and audio, decode the video and audio individually, and output the decoded video and audio, for example. In such case, processes after the decoding process are often implemented by hardware in view of performance requirements.

On the other hand, there is an increased demand for power conservation in recent content reproducing apparatuses. In this respect, for example, an image display apparatus is known that sets up an image display unit to power saving mode when an image signal is not included in received content and sets up an audio output unit to power saving mode when an audio signal is not included in the received content (see e.g., Japanese Laid-Open Patent Publication No. 2009-027458).

According to the technique disclosed in Japanese Laid-Open Patent Publication No. 2009-027458, power control is performed based on whether content includes an audio signal or an image signal. Thus, power saving control cannot be adequately performed in a case where content including an audio signal and an image signal primarily contain a silent portion and a black screen, for example. That is, in a content reproducing apparatus that reproduces content including audio and video, it has been difficult to adaptively perform power saving control according to the substance of the content being reproduced, for example.

SUMMARY OF THE INVENTION

One aspect of the present invention relates to enabling a content reproducing apparatus that reproduces content including audio and video to adaptively perform power saving control according to the substance of the content being reproduced.

According to an embodiment of the present invention, a content reproducing apparatus includes a reproducing unit configured to reproduce content including audio and video, and a power control unit configured to perform power control of the reproducing unit based on a reproducing position of the content and non-reproduction period information indicating at least one of a period during which reproduction of the audio of the content is unnecessary and a period during which reproduction of the video of the content is unnecessary.

BRIEF DESCRIPTION OF THE DRAWINGS

FIG. 8 is a flowchart illustrating a content reproducing process according to the second embodiment; and FIG. 9 is a table illustrating an example of reproduction history information stored in an external device according to the second embodiment.

DESCRIPTION OF THE PREFERRED EMBODIMENTS

In the following, embodiments of the present invention are described with reference to the accompanying drawings.

<Overview>

A content reproducing apparatus according to an embodiment of the present invention performs power saving control based on a reproducing position of content and non-reproduction period information indicating a period during which reproduction of audio is unnecessary and a period during which reproduction of video is unnecessary.

Note that the above reproducing position of content may represent the corresponding time of the current reproducing position of the content with respect to the start time of the content. For example, assuming the content start time is "0 m00 s (0 min 0 sec)", a content reproducing position 1 minute after the content start time may be represented as "1 m00 s (1 min 0 sec)". Note that the content reproducing position may alternatively be represented by information other than time information such as the number of frames from the content reproducing start point, for example. Also, the time position that is used as a reference for the content reproducing position does not necessarily have to be the content start time but may also be the content end time, for example.

Figure 1:
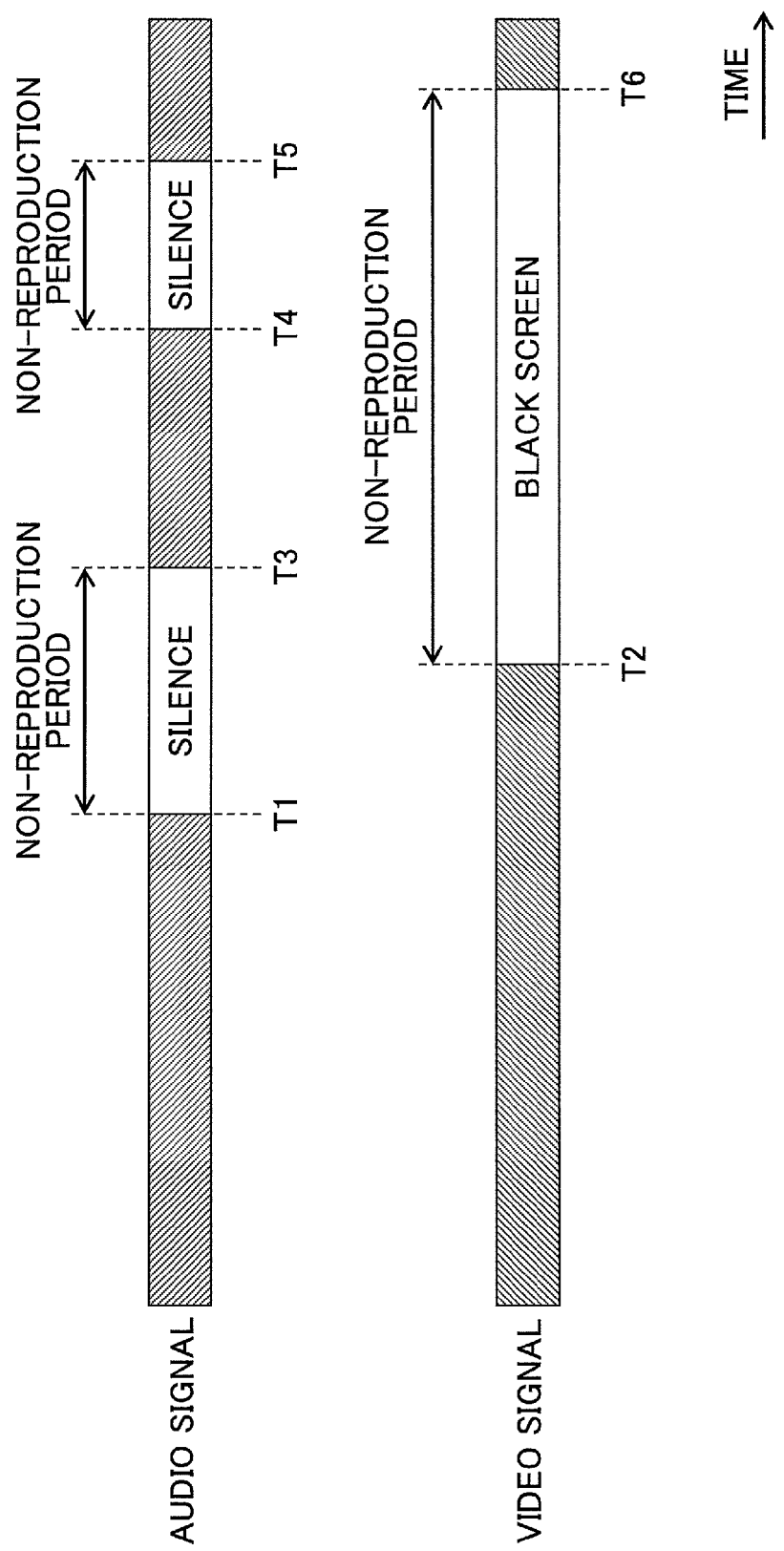
FIG. 1 schematically illustrates power saving operations of a content reproducing apparatus according to an embodiment of the present invention.

FIG. 1 schematically illustrates power saving operations of a content reproducing apparatus according to an embodiment of the present invention. FIG. 1 illustrates an audio signal and a video signal included in content. The audio signal and the video signal each include non-reproduction periods during which reproduction of audio or video is unnecessary. In the example of FIG. 1, an audio non-reproduction period corresponds to a period during which the audio signal represents data corresponding to "silence", and a video non-reproduction period corresponds to a period during which the video signal represents a "black screen". Note that "silence" and "black screen" are examples of a non-reproduction period during which reproduction of content is unnecessary. Non-reproduction period information according to the present embodiment may include time information such as time periods T1-T3 and T4-T5 representing audio non-reproduction periods, and time period T2-T6 representing a video non-reproduction period, for example.

The content reproducing apparatus according to the present embodiment performs power saving control operations with respect to components of the content reproducing apparatus related to video reproduction and components of the content reproducing apparatus related to audio reproduction based on non-reproduction period information that is acquired in advance and the reproducing position (time) of the content being reproduced. For example, when the content reproducing position reaches time T1 of FIG. 1, the content reproducing apparatus may switch the components related to audio reproduction for reproducing the audio signal to power saving mode, and when the content reproducing position reaches time T3, the content reproducing apparatus may switch the components related to audio reproduction back to normal mode. Similarly, when the content reproducing position reaches time T2 of FIG. 1, the content reproducing apparatus may switch the components related to video reproduction for reproducing the video signal to power saving mode, and when the content reproducing position reaches time T6, the content reproducing apparatus may switch the components related to video reproduction back to normal mode, for example.

The content reproducing apparatus preferably includes a non-reproduction period information generation unit for generating non-reproduction period information of content that is being reproduced and a storage unit such as an external server or an internal storage device for storing the generated non-reproduction period information, for example. In this way, once the content is reproduced, non-reproduction period information of the content may be generated and stored such that from the second time and onward, power saving control operations may be adaptively performed based on the non-reproduction period information that has been stored in advance, for example.

<Content Reproducing Apparatus Configuration>

Figure 2:
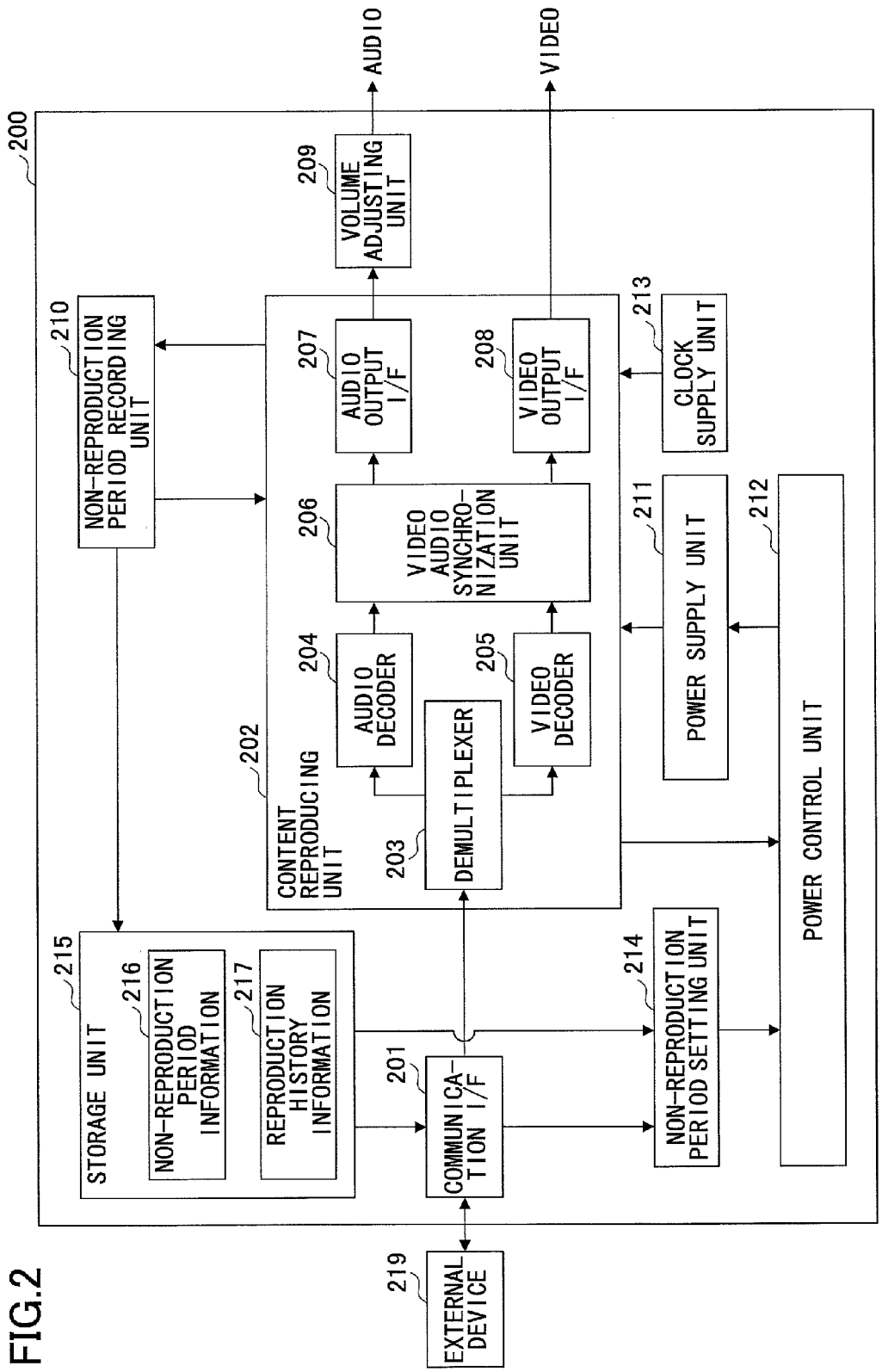
FIG. 2 is a block diagram illustrating an exemplary configuration of the content reproducing apparatus.

FIG. 2 is a block diagram illustrating an exemplary configuration of a content reproducing apparatus 200 according to an embodiment of the present invention. The content reproducing apparatus 200 includes a communication I/F (interface) 201, a content reproducing unit 202, a volume adjusting unit 209, a non-reproduction period recording unit 210, a power supply unit 211, a power control unit 212, a clock supply unit 213, a non-reproduction period setting unit 214, and a storage unit 215.

The communication I/F 201 connects the content reproducing apparatus 200 to a network such as the Internet or a LAN (Local Area Network), for example, and enables data exchange with an external device such as a server that is connected to the network. Note that in some embodiments, the communication I/F 201 may be configured to enable data exchange (data read/write operations) with a recording medium such as a USB memory (external device) that is directly connected to the content reproducing apparatus 200 rather than the network.

The content reproducing unit 202 reproduces content including audio and video. The content reproducing unit 202 includes a demultiplexer 203, an audio decoder 204, a video decoder 205, an audio video synchronization unit 206, an audio output I/F 207, and an image output I/F 208.

The demultiplexer 203 separates content input thereto into an audio signal and a video signal and outputs the separated audio and video signals. For example, with respect to content that is arranged into packets, the demultiplexer 203 may be able to determine whether each packet corresponds to audio data or video data based on identification information included in a header of the packet. The demultiplexer 203 is typically implemented by software.

The audio decoder 204 decodes audio data that is input thereto and outputs the decoded audio data. Note that although many audio decoders are implemented by SoC (System on Chip) rather than being implemented by hardware, in the present embodiment, it is assumed that the audio decoder 204 is implemented by hardware.

The video decoder 205 decodes video data input thereto and outputs the decoded video data. Note that although many video decoders are implemented by SoC rather than being implemented by hardware, in the present embodiment, it is assumed that the video decoder 205 is implemented by hardware.

The video audio synchronization unit 206 synchronizes audio and video input thereto and outputs the synchronized audio and video. The audio output I/F 207 outputs the audio signal in a format matching the format used by an audio output device such as a speaker. The video output I/F 208 outputs a video signal in a format matching the input format used by a video output device such as a display.

The volume adjusting unit 209 changes the volume of audio to be reproduced in accordance with a user operation, for example.

The non-reproduction period recording unit 210 acquires a period during which reproduction of audio is unnecessary and a period during which reproduction of video is unnecessary while content is being reproduced, and records the acquired periods as non-reproduction period information 216 in the storage unit 215.

The power supply unit 211 supplies power to each component (block) of the content reproducing unit 202 based on an instruction from the power control unit 212, for example. In the present embodiment, it is assumed that the power supply unit 211 is capable of turning on/off the power of each component to implement power saving control, for example.

The power control unit 212 controls power supply operations of the power supply unit 211 based on the reproducing position of content being reproduced by the content reproducing unit 202 and non-reproduction period information acquired by the non-reproduction period setting unit 214. The clock supply unit 213 supplies a clock signal to the content reproducing unit 202, for example.

The non-reproduction period setting unit 214 acquires the non-reproduction period information 216 stored in an external device 219 or the storage unit 215, for example, and sets up the acquired non-reproduction period information in the power control unit 212.

The storage unit 215 stores the non-reproduction period information 216 generated by the non-reproduction period recording unit 210 and reproduction history information 217 including the non-reproduction period information, for example. The storage unit 215 may also store the content to be reproduced, for example. The storage unit 215 may be implemented by a RAM (Random Access Memory) or a Flash ROM (Read Only Memory), for example.

With the above configuration, the power control unit 212 may control the power supply unit 211 based on the non-reproduction period information 216 acquired by the non-reproduction period setting unit 214 and information indicating the reproducing position of the content acquired from the content reproducing unit 202. For example, the power control unit 212 may stop or reduce power supply to the components (blocks) related to audio reproduction such as the audio decoder 204 and the audio output I/F 207 during an audio non-reproduction period (e.g., time period T1-T3 and time period T4-T5 of FIG. 1). Similarly, the power control unit 212 may stop or reduce power supply to the components (blocks) related to video reproduction such as the video decoder 205 and the video output I/F 208 during a video non-reproduction period (e.g., time period T2-T6 in FIG. 1).

Note that the configuration illustrated in FIG. 2 is merely one example and is not intended to limit the scope of the present invention. For example, power saving control operations by the power control unit 212 with respect to the components related to audio reproduction and the components related to video reproduction do not necessarily have to be performed via the power supply unit 211. In other examples, the power control unit 212 may rewrite registered setting values of the content reproducing unit 202 to alter and switch the operation modes of the components related to audio production and the components related to video reproduction to/from the power saving mode and the normal mode, for example. Alternatively, the power control unit 212 may control the supply of clock signals from the clock supply unit 213 to the components of the content reproducing unit 202 to reduce current consumption, for example.

In sum, power saving control operations by the power control unit 212 with respect to the components related to audio reproduction and the components related to video reproduction may be implemented in any manner as long as power consumption may be reduced during non-reproduction periods as compared to time periods during which content is reproduced.

Functional Configuration

First Embodiment

Figure 3:
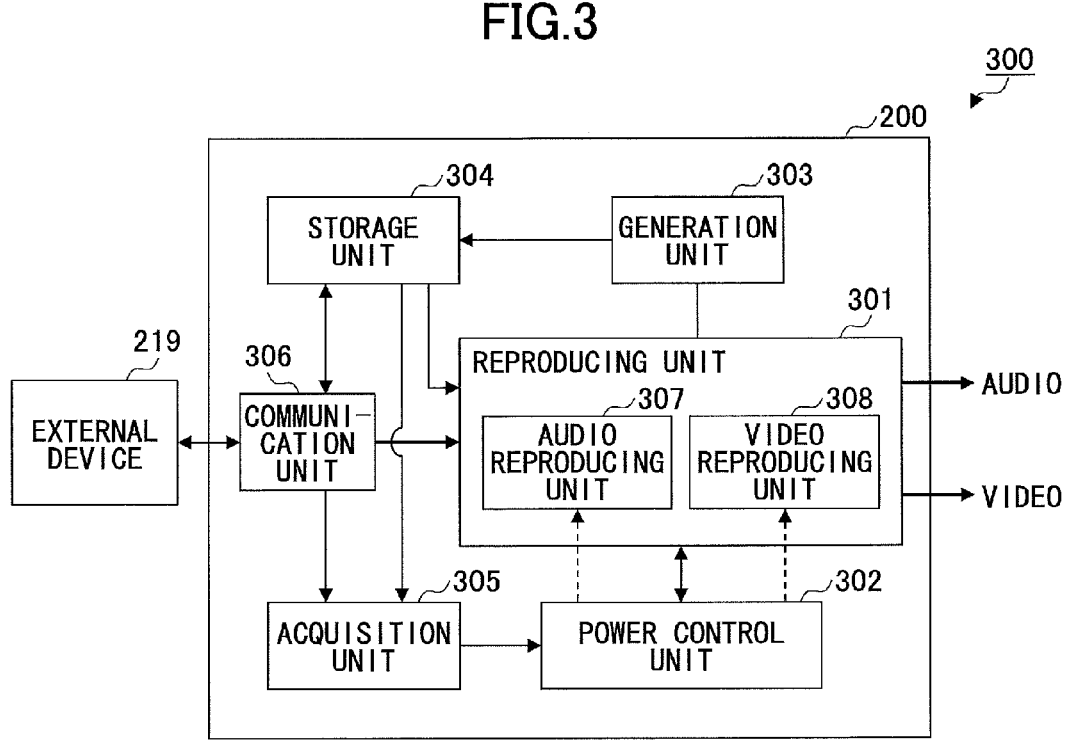
FIG. 3 is a block diagram illustrating a functional configuration of the content reproducing apparatus according to a first embodiment of the present invention.

FIG. 3 is a block diagram illustrating a functional configuration of a content reproducing system 300 according to a first embodiment of the present invention. In FIG. 3, the content reproducing apparatus 200 includes a reproducing unit 301, a power control unit 302, a generation unit 303, a storage unit 304, an acquisition unit 305, and a communication unit 306.

The reproducing unit 301 is a functional component related to reproducing content including audio and video. The reproducing unit 301 may be implemented by the content reproducing unit 202 of FIG. 2, for example. The reproducing unit 301 includes an audio reproducing unit 307 and a video reproducing unit 308.

The audio reproducing unit 307 reproduces audio included in the content to be reproduced by the reproducing unit 301. The audio reproducing unit 307 may be implemented by the audio decoder 204, the audio output I/F 207, and the volume adjusting unit 209 of FIG. 2, for example.

The video reproducing unit 308 reproduces video included in the content to be reproduced by the reproducing unit 301. The image reproducing unit 308 may be implemented by the video decoder 205 and the image output I/F 208 of FIG. 2, for example.

The power control unit 302 performs power control of the reproducing unit 301 based on non-reproduction period information indicating a period during which reproduction of audio is unnecessary and a period during which reproduction of video is unnecessary while content is reproduced by the reproducing unit 301. The power control unit 302 may be implemented by the power supply unit 211 and the power control unit 212 of FIG. 2, for example.

At the start of the period during which reproduction of audio included in the content being reproduced by the reproducing unit 301 is unnecessary (e.g., time T1 or time T4 of FIG. 1), the power control unit 302 may switch the audio reproducing unit 307 to power saving mode in which power consumption may be reduced as compared to a case where audio is reproduced, for example. Also, at the end of the period during which reproduction of audio included in the content being reproduced by the reproducing unit 301 is unnecessary (e.g., time T3 or time T5 of FIG. 1), the power control unit 302 may switch the power control unit 302 back to normal mode that enables audio reproduction, for example.

Further, at the start of the period during which reproduction of video of the content being reproduced by the reproducing unit 301 is unnecessary (e.g., time T2 of FIG. 1), the power control unit 302 may switch the video reproducing unit 308 to power saving mode in which power consumption may be reduced as compared to a case where video is reproduced, for example. Also, at the end of the period during which reproduction of video of the content being reproduced by the reproducing unit 301 is unnecessary (e.g., time T6 of FIG. 1), the power control unit 302 may switch the video reproducing unit 308 back to normal mode that enables video reproduction, for example.

While the reproducing unit 301 reproduces content, the generation unit 303 generates non-reproduction period information of the content that is being reproduced by the reproducing unit 301. The generation unit 303 may be implemented by the non-reproduction period recording unit 210 of FIG. 2, for example. When audio data of the content being reproduced corresponds to "silence", for example, the generation unit 303 may determine the period during which the audio data corresponds to "silence" as an audio non-reproduction period. When video data of the content being reproduced corresponds to a "black screen", for example, the generation unit 303 may determine the period during which the video data corresponds a "black screen" as a video non-reproduction period. In this way, the generation unit 303 may generate non-reproduction period information.

The storage unit 304 stores information such as the non-reproduction period information generated by the generation unit 303, for example. The storage unit 304 may be implemented by the storage unit 215 of FIG. 2, for example. Note that the storage unit 304 may store other types of information such as the content to be reproduced by the reproducing unit 301 and reproduction history information including non-reproduction period information acquired from the external device 219, for example.

The acquisition unit 305 acquires non-reproduction information of the content to be reproduced by the reproducing unit 301 that is stored in advance in the storage unit 304 or the external device 219, for example. The acquisition unit 305 may be implemented by the non-reproduction period setting unit 214 of FIG. 2, for example.

The communication unit 306 transmits and receives information to/from the external device 219. For example, the communication unit 306 may transmit/receive the content to be reproduced by the reproducing unit 301 and information associated with the content such as non-reproduction period information and reproduction history information of the content. The communication unit 306 may be implemented by the communication I/F 201 of FIG. 2 and a relevant control program, for example.

<Process Flow>

Figure 4:
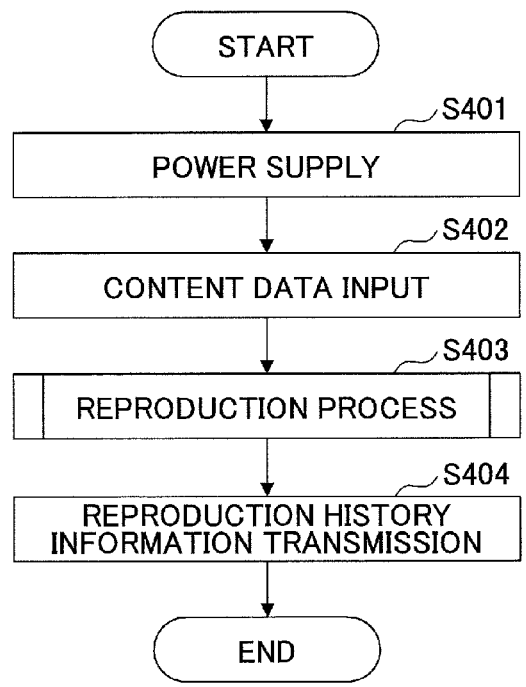
FIG. 4 is a flowchart illustrating a content reproducing process according to the first embodiment.

FIG. 4 is a flowchart illustrating a content reproduction process according to the first embodiment.

In step S401, in response to a user operation such as a content reproducing operation or a power-on operation, for example, the power control unit 302 of the content reproducing apparatus 200 may start supplying power to relevant components such as the reproducing unit 301.

In step S402, the content reproducing apparatus 200 inputs content data to be reproduced by the reproducing unit 301. For example, the content reproducing apparatus 200 may acquire the content data from the external device 219 via the communication unit 306 and store the acquired content data in the storage unit 304.

In step S403, the reproducing unit 301 of the content reproducing apparatus 200 performs a content reproduction process based on the content data stored in the storage unit 304. At this time, if the external device 219 stores non-reproduction period information associated with the content data to be reproduced, the acquisition unit 305 acquires the non-reproduction period information from the external device 219. Note that in the following descriptions, it is assumed that the content is being reproduced for the first time such that the external device 219 does not have non-reproduction period information associated with the content to be reproduced stored in advance.

Note that the content data and the non-reproduction period information do not necessarily have to be acquired from the external device 219. For example, the content reproduction process may be performed based on content data and non-reproduction period information stored in the storage unit 304. Also, while the content is being reproduced, the generation unit 303 generates non-reproduction period information of the content being reproduced and stores the generated non-reproduction period information in the storage unit 304.

In step S404, after the content reproduction process has been completed, for example, the content reproducing apparatus 200 transmits reproduction history information including the non-reproduction period information of the content stored in the storage unit 304 to the external device 219. Note that the transmission timing of the reproduction history information to the external device 219 does not necessarily have to be at the end of the content reproduction process but may be other times such as before turning off the power of the content reproducing apparatus 200 or before starting reproduction of different content, for example. Further, the content reproducing apparatus 200 does not necessarily have to transmit the reproduction history information to an external device but may instead store the reproduction history information internally in the storage unit 304, for example.

Figure 5:
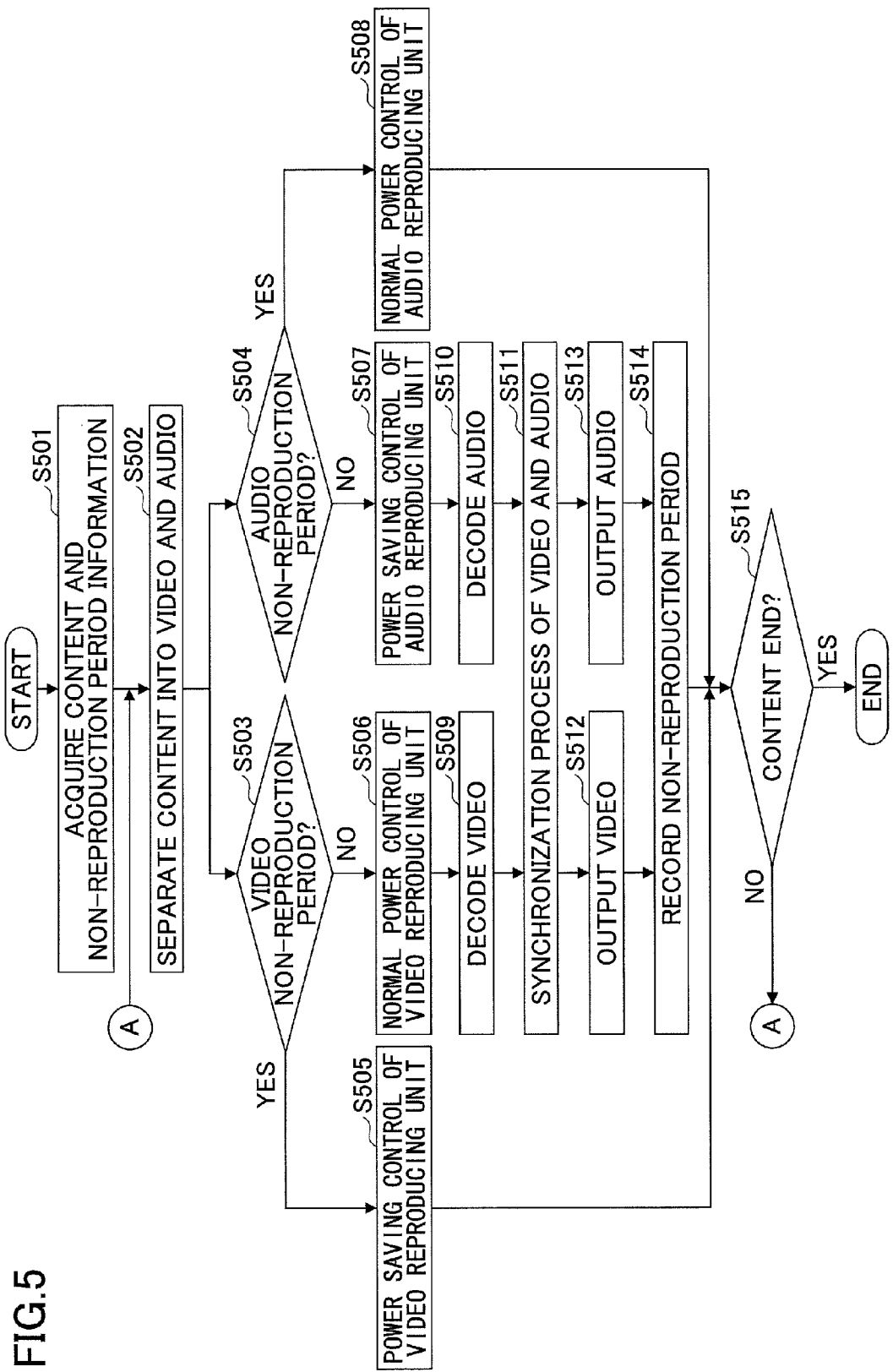
FIG. 5 is a flowchart illustrating a repeat reproduction process according to the first embodiment.

FIG. 5 is a flowchart illustrating a repeat reproduction process according to the first embodiment. Note that repeat reproduction refers to a process of reproducing content that has already been reproduced at least once by the reproduction process as illustrated in FIG. 4, for example. That is, repeat reproduction refers to a process of reproducing content that has corresponding non-reproduction period information stored in the storage unit 304, for example.

When the process is started, the content reproducing apparatus 200 acquires content to be reproduced and non-reproduction period information associated with the content to be reproduced from the external device 219 or the storage unit 304 (step S501). The reproducing unit 301 separates the acquired content into video and audio (step S502).

Then, the power control unit 302 determines whether the audio and/or the video to be reproduced corresponds to an audio non-reproduction period and/or a video non-reproduction period based on the reproducing position of the content acquired from the reproducing unit 301 and the acquired non-reproduction period information (steps S503 and S504).

In step S503, if it is determined that the reproducing position (time) of the content corresponds to a video non-reproduction period, power-saving control of the video reproducing unit 308 is performed (step S505), and the process proceeds to step S515. In the present descriptions, power saving control of the video reproducing unit 308 refers to control operations for switching the video reproducing unit 308 to power saving mode in the case where the video reproducing unit 308 is in normal mode that enables video reproduction, and control operation for maintaining the video reproducing unit 308 in the power saving mode in the case where the video reproducing unit 308 is already in the power saving mode. Note that power saving control of the audio reproducing unit 307 involves similar control operations with respect to the audio reproducing unit 307.

On the other hand, if it is determined in step S503 that the reproducing position (time) of the content does not correspond to a video non-reproduction period, normal power control of the video reproducing unit 308 is performed (step S506), and the process proceeds to step S509 where the video is decoded. In the present descriptions, normal power control refers to control operations for maintaining the video reproducing unit 308 in normal mode that enables video reproduction in the case where the video reproducing unit 308 is already in the normal mode, and control operations for switching the video reproducing unit 308 back to normal mode in the case where the video reproducing unit 308 is in the power saving mode. Note that normal power control of the audio reproducing unit 307 involves similar control operations with respect to the audio reproducing unit 307.

Also, in step S504, if it is determined that the reproducing position (time) of the content corresponds to an audio non-reproduction period, power saving control of the audio reproducing unit 307 is performed (step S508), and the process proceeds to step S515.

On the other hand, if it is determined in step S504 that the reproducing position (time) of the content does not correspond to an audio non-reproduction period, normal power control of the audio reproducing unit 307 is performed (step S507), and the process proceeds to step S510 where the audio is decoded.

Then, in step S511, a synchronization process of the video and the audio is performed. For example, the video reproducing unit 308 may synchronize video reproduction time information with a system clock, and the audio reproducing unit 307 may synchronize audio reproduction time information with the system clock. By separately performing synchronization of the audio and synchronization of the video with respect to a reference clock in the above-described manner, for example, the synchronization process may proceed in the same manner even in a case where one of the audio or the video is not decoded.

After the synchronization process, the video reproducing unit 308 outputs the video (step S512), and the audio reproducing unit 307 outputs the audio (step S513). Also, the generation unit 303 stores (records) non-reproduction period information of the content (step S514).

Further, the content reproducing apparatus 200 determines whether the content being reproduced has reached its end (step S515). If the content is at its end, the process is terminated. If the content is not yet at its end, the process returns to step S502 and another process cycle is repeated.

In the following, the non-reproduction period information recorded (stored) by the generation unit 303 is described. In steps S514 of FIG. 5, the generation unit 303 determines whether an audio signal has to be reproduced and whether a video signal has to be reproduced.

For example, the generation unit 303 may determine that reproduction of audio is unnecessary when audio data (binary) corresponds to data representing silence. Alternatively, the generation unit 303 may determine that reproduction of audio is unnecessary when audio data does not exist, for example.

Further, the generation unit 303 may determine that reproduction of video is unnecessary when video data (binary) corresponds to data representing a black screen, for example. Alternatively, the generation unit 303 may determine that reproduction of video is unnecessary when video data does not exist, for example.

Figure 6:
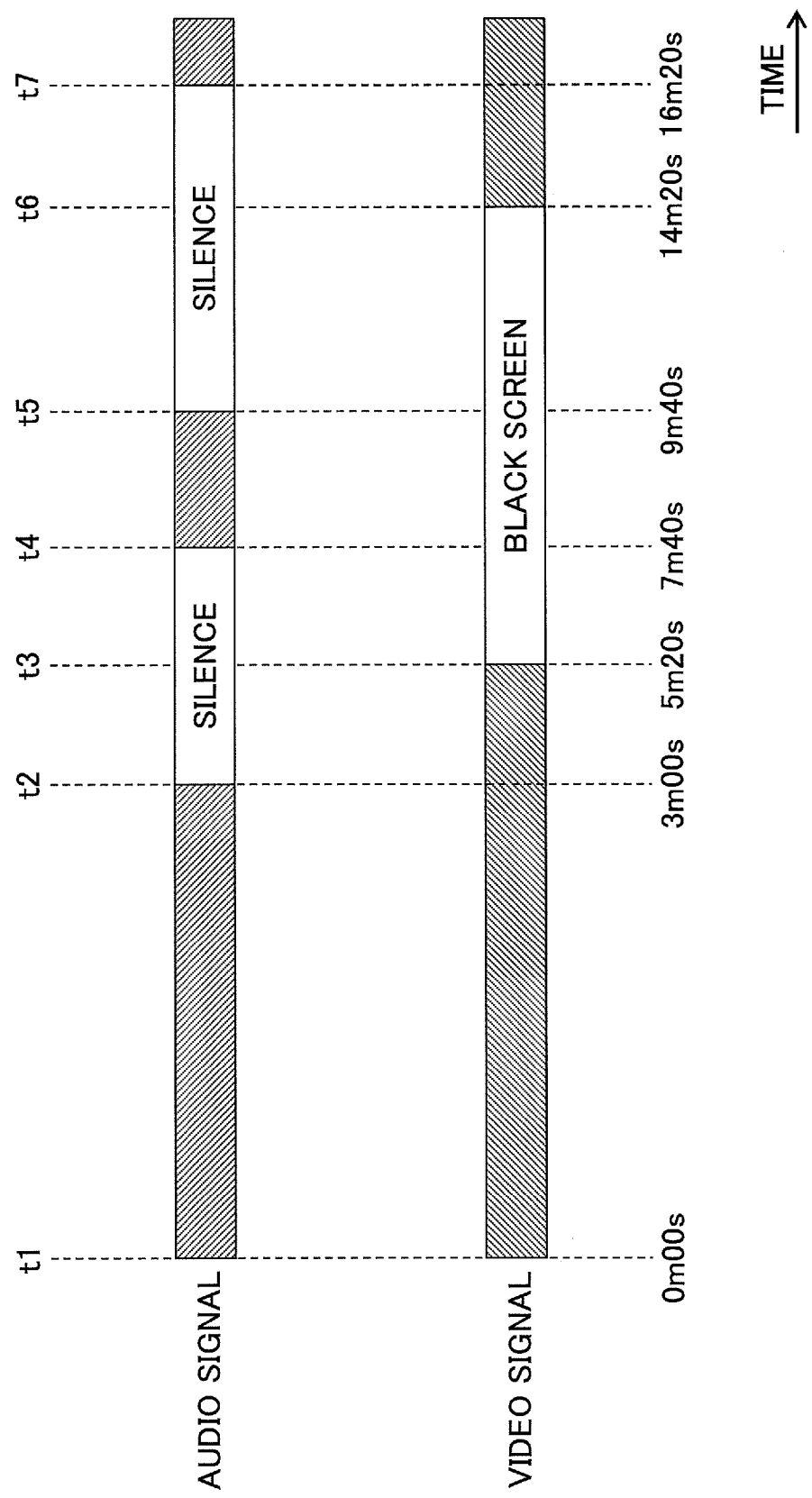
FIG. 6 illustrates a non-reproduction period according to the first embodiment.

FIG. 6 is a diagram illustrating non-reproduction periods according to the first embodiment. In FIG. 6, content reproduction starts at time t1, and then, when the audio signal turns into "silence" at time t2, the generation unit 303 records the corresponding time "3 m00 s (3 min 0 sec)" as the start time of an audio non-reproduction period. Similarly, at time t3, when the video signal turns into a "black screen", the generation unit 303 records the corresponding time "5 m20 s (5 min 20 sec)" as the start time of a video non-reproduction period.

Also, at time t4, when the audio signal no longer corresponds to "silence", the generation unit 303 records the corresponding time "7 m40 s (7 min 40 sec)" as the end time of the audio non-reproduction period. Then, at time t5, when the audio signal turns into "silence" once again, the generation unit 303 records the corresponding time "9 m40 s (9 min 40 sec)" as the start time of the next audio non-reproduction period.

Further, at the time t6, when the video signal no longer corresponds to a "black screen", the generation unit 303 records the corresponding time "14 m20 s (14 min 20 sec)" as the end time of the video non-reproduction period. Similarly, at time t7, when the audio signal no longer corresponds to "silence", the generation unit 303 records the corresponding time "16 m20 s (16 min 20 sec)" as the end time of the audio non-reproduction period.

For example, by implementing the above-described process, audio non-reproduction periods of "3 m00 s to 7 m40 s" and "9 m40 s to 16 m20 s" and a video non-reproduction period of "5 m20 s to 14 m20 s" may be recorded (stored) as non-reproduction period information of the content in the storage unit 304, for example.

As described above, the content reproducing apparatus 200 according to the present embodiment may generate non-reproduction period information of content when the content is reproduced for the first time, for example. In this way, upon reproducing the content for the second time and thereafter, the content reproducing apparatus 200 may perform power saving control of relevant components based on the generated non-reproduction period information, for example.

Note that "silence" in the audio and "black screen" in the video are merely illustrative examples of non-reproduction periods according to the present embodiment and are not intended to limit the scope of the present invention. For example, the generation unit 303 may determine that reproduction of audio is unnecessary when the level of the audio is below a predetermined value.

Also, the generation unit 303 may determine that video decoding is unnecessary during a non-decoding period (non-reproduction period) in which a still image is continuously displayed, and the power control unit 302 may switch the video decoder 205 to power saving mode during such non-decoding period, for example.

Second Embodiment

Functional Configuration (Functional Configuration of Content Reproducing Apparatus)

Figure 7:
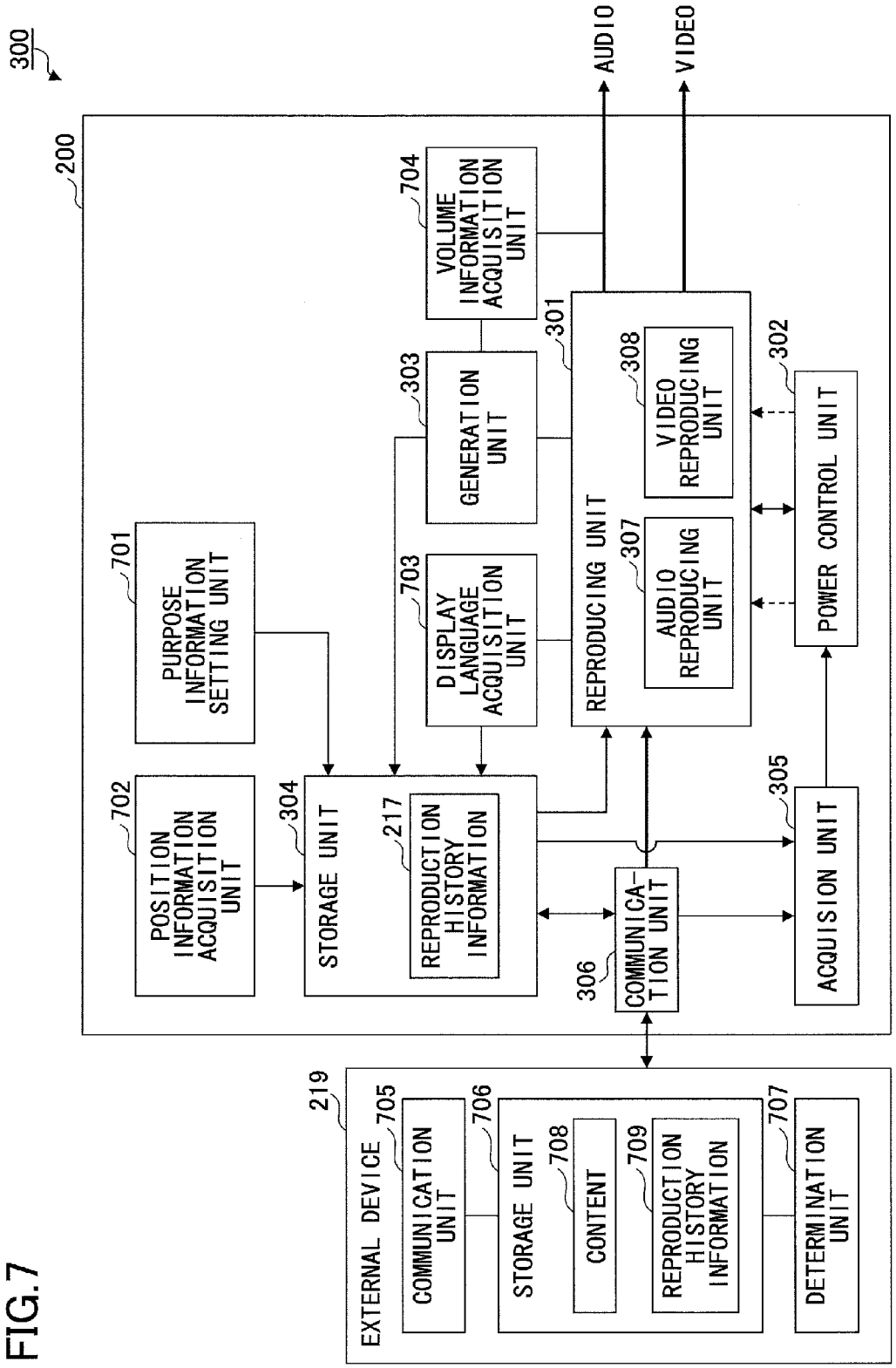
FIG. 7 is a block diagram illustrating a functional configuration of the content reproducing apparatus according to a second embodiment of the present invention.

FIG. 7 is a block diagram illustrating a functional configuration of the content reproducing system 300 according to a second embodiment of the present invention. The content reproducing apparatus 200 according to the present embodiment includes a purpose information setting unit 701, a position information acquisition unit 702, a display language acquisition unit 703, and a volume information acquisition unit 704 in addition to the functional elements of the content reproducing apparatus 200 according to the first embodiment that are illustrated in FIG. 3. Note that the following descriptions primarily relate to the above functional elements that are not included in the content reproducing apparatus 200 according to the first embodiment, and descriptions of the functional elements that are identical to those of the first embodiment are omitted.

The purpose information setting unit 701 sets up information indicating the utilization purpose (reproduction purpose) of the content to be reproduced. The purpose information setting unit 701 may prompt a user to input purpose information by displaying a reproduction purpose input screen on a display, for example. Then, based on the information input by the user via a touch panel or a keyboard, for example, the purpose information setting unit 701 may set up the purpose information indicating the reproduction purpose of the content to be reproduced.

The position information acquisition unit 702 acquires position information indicating the position of the content reproducing apparatus 200 when it is reproducing content, for example. The position information acquisition unit 702 may acquire position information indicating the current position of the content reproducing apparatus 200 that is reproducing content based on GPS (Global Positioning System), IMES (Indoor Messaging System), or some other positioning system, for example.

IMES is a positioning system that enables acquisition of position information even indoors where radio waves from GPS satellites are not easily reached. In GPS, only longitude and latitude information can be acquired. However, by utilizing IMES, height information (floor information) can also be acquired. Thus, for example, IMES may be useful for determining a specific location such as a specific conference room within a building. Note that GPS and IMES are merely examples of positioning systems that may be used in the present embodiment. The position information acquisition unit 702 may also be configured to acquire position information based on other positioning systems using a wireless LAN or wireless tags, for example.

The display language acquisition unit 703 acquires display language information indicating the display language that is to be displayed at the time content is reproduced. For example, when the display language setting of the content reproducing apparatus 200 is changed before or during a content reproduction process, the display language acquisition unit 703 may acquire the updated display language setting, for example. Also, the content reproducing apparatus 200 may have a default display language setting (e.g., Japanese), and the display language acquisition unit 703 may be configured to use the default display language setting if a display language is not particularly specified by the user, for example.

The volume information acquisition unit 704 acquires volume information of audio data or an audio signal output by the reproducing unit 301. The generation unit 303 generates "non-reproduction period based on volume" information based on the volume information acquired by the volume information acquisition unit 704. As one specific example, the volume information acquisition unit 704 may detect when the audio of the content reproduced by the content reproducing apparatus 200 is "muted", and in turn, the generation unit 303 may set up the period during which the audio is "muted" as a non-reproduction period. As another example, the volume information acquisition unit 704 may detect when the volume of the audio reproduced by the content reproducing apparatus 200 is reduced to be less than a predetermined volume, and in turn, the generation unit 303 may set up the period during which the volume of the audio is set lower than the predetermined volume as a non-reproduction period.

(Functional Configuration of External Device)

In FIG. 7, the external device 219 may be an information processing apparatus such as a server or some other general computer that is connected to the content reproducing apparatus 200 via a network, for example. In FIG. 7, the external device 219 includes a communication unit 705, a storage unit 706, and a determination unit 707.

The communication unit 705 is connected to the content reproducing apparatus 200 via a network, for example, and is configured to transmit and receive data.

The storage unit 706 stores content 708 and reproduction history information 709. The reproduction history information 709 may include information received from the content reproducing apparatus 200 such as purpose information, position information, display language information, non-reproduction period information, and the reproduction history information 217 containing the above items of information, for example.

The determination unit 707 refers to the reproduction history information 709 stored in the storage unit 706 and determines the reproduction history information or the non-reproduction period information to be transmitted to the content reproduction apparatus 200 in response to a reproduction history information acquisition request from the content reproducing apparatus 200. Note that the method used for determining the reproduction history information or the non-reproduction period information to be transmitted is described below.

<Process Flow>

FIG. 8 is a flowchart illustrating exemplary process operations of the content reproducing system 300 according to the second embodiment.

In step S801, the content reproducing apparatus 200 acquires its current position information from the position information acquisition unit 702 in response to a user operation such as a content reproducing operation or a power-on operation, for example.

In step S802, the content reproducing apparatus 200 prompts the user to input a reproduction purpose by having the purpose information setting unit 701 display a reproduction purpose input screen on a display, for example, and sets up the purpose information based on the information input by the user.

In step S803, the content reproduction apparatus 200 has the display language acquisition unit 703 acquire the display language information that is set up for the content to be reproduced.

In step S804, the content reproducing apparatus 200 has the communication unit 306 transmit the acquired purpose information, position information, and display language information as pre-reproduction information to the external device 219.

In step S805, the power control unit 302 of the content reproducing apparatus 200 supplies power to the components related to content reproduction such as the reproducing unit 301.

In step S806, the content reproducing apparatus 200 inputs content data to be reproduced. For example, the content reproducing apparatus 200 may have the communication unit 306 acquire the content data to be reproduced from the external device 219 and store the acquired content data in the storage unit 304.

In step S807, the reproducing unit 301 of the content reproducing apparatus 200 performs a reproduction process for reproducing the content data. For example, the reproducing unit 301 may reproduce audio and video based on the content data acquired from the external device 219 and stored in the storage unit 304. Also, at this time, the generation unit 303 of the content reproducing apparatus 200 generates non-reproduction period information of the content being reproduced. Further, in the present embodiment, the generation unit 303 generates "non-reproduction period based on volume" information based on the volume information acquired by the volume information acquisition unit 704. For example, the generation unit 303 may generate the "non-reproduction period based on volume" information by determining a period during which the audio of the content is muted as a non-reproduction period.

In step S808, the content reproduction apparatus 200 transmits via the communication unit 306, for example, reproduction history information including the non-reproduction period information generated by the generation unit 303 to the external device 219. Note that the non-reproduction period information transmitted to the external device 219 may also include the above-described "non-reproduction period based on volume" information, for example.

In step S809, the external device 219, may update the reproduction history information 709 stored in the storage unit 706 based on the reproduction history information received from the content reproducing apparatus 200, for example. Alternatively, the external device 219 may store the reproduction history information received from the content reproducing apparatus 200 in the storage unit 706 as a new version of the reproduction history information 709.

FIG. 9 is a table illustrating an example of the reproduction history information stored in the external device 219 of the content reproducing system 300 according to the second embodiment. The reproduction history information 709 stored in the external device 219 includes information items such as a file name 901, a reproduction purpose 902, position information 903, a display language 904, a non-reproduction period based on volume 905, and a non-reproduction period 906.

The file name 901 is information indicating a file name of the content. The reproduction purpose 902 is information indicating a reproduction purpose that may be set up by the user upon reproducing the content. The position information 903 is information indicating the position of the content reproduction apparatus 200. The display language 904 may be information indicating the language of text information such as subtitles to be displayed upon reproducing the content, for example.

The non-reproduction period based on volume 905 may be information indicating a non-reproduction period determined based on volume information acquired during reproduction of the content. For example, the non-reproduction period based on volume 905 may be information indicating a certain portion of the content file where the audio has been muted. The non-reproduction period 906 may be information indicating a period during which content reproduction is determined to be unnecessary such as a period during which audio data corresponds to "silence" and video data corresponds to a "black screen" as described above in connection with the first embodiment, for example.

In the present embodiment, three different purposes including "in-house meeting," "demonstration," and "private" are contemplated as the reproduction purpose 902. The determination unit 707 determines the non-reproduction period information to be transmitted to the content reproducing apparatus 200 based on the reproduction purpose 902 and the pre-reproduction information received from the content reproducing apparatus 200 in step S804 of FIG. 8.

For example, in the case where "in-house meeting" is the reproduction purpose 902, the determination unit 707 may refer to a plurality of sets of the reproduction history information 709 stored in the storage unit 706 to find the reproduction history information 709 with the position information 903 and the display language 904 matching the position information and the display language specified in the received pre-reproduction information, and identify the non-reproduction period 906 and the non-reproduction period based on volume 905 included in the corresponding reproduction history information 709 as the non-reproduction period information to be transmitted to the content reproducing apparatus 200. Note that if there is no information stored as the non-reproduction period based on volume 905, the determination unit 707 may identify the non-reproduction period 906 as the non-reproduction period information to be transmitted. Also, in a case where there is no reproduction history information 709 with the position information 903 and the display language 904 that match those included in the received pre-reproduction information, for example, the external device 219 may not transmit any non-reproduction period information to the content reproducing apparatus 200, and may store a new set of reproduction history information with new position information and/or new display language information after a content reproduction process is performed by the content reproducing apparatus 200.

In the case where "in-house meeting" is the reproduction purpose 902, the same content may be used by a plurality of users in a plurality of conference rooms, for example. Accordingly, different sets of reproduction history information 709 are preferably used depending on the position information 903 and the display language 904, for example.

Also, for example, in the case where "demonstration" is the reproduction purpose 902, the determination unit 707 may identify the non-reproduction period information 906 for the corresponding file name 901 as the non-reproduction period information to be transmitted irrespective of the received pre-reproduction information. Also, if there is information stored as the non-reproduction period based on volume 905 for the corresponding file name 901, the determination unit 707 may also identify the non-reproduction period information based on volume 905 as the non-reproduction period information to be transmitted. Note that in a case where there is more than one set of reproduction history information 709 for the corresponding file name 901 including at least one set that has information stored as the non-reproduction period based on volume 905 and at least one set that does not have information stored as the non-reproduction period based on volume 905, the determination unit 707 does not include the non-reproduction period based on volume 905 in the non-reproduction period information to be transmitted.

Further, for example, in the case where "private" is the reproduction purpose 902, the determination unit 707 may identify the non-reproduction period information 906 for the corresponding file name 901 as the non-reproduction period information to be transmitted irrespective of the received pre-reproduction information. Note that in the case where "private" is the reproduction purpose 902, the determination unit 707 does not include the non-reproduction period based on volume 905 in the non-reproduction period information to be transmitted.

Note that the above determination operations based on the reproduction purpose 902 are merely exemplary determination operations by the determination unit 707. For example, the determination unit 707 may also determine the non-reproduction period information or the reproduction history information to be transmitted to the content reproducing apparatus 200 based on a policy received from the content reproducing apparatus 200.

Also, in some embodiments, the content reproducing apparatus 200 may merely include at least one of the purpose information setting unit 701, the position information acquisition unit 702, the display language acquisition unit 703, and the volume information acquisition unit 704 of FIG. 7.

For example, the content reproducing apparatus 200 may only include the purpose information setting unit 701 in addition to the functional elements of the first embodiment that are illustrated in FIG. 3. In this case, the content reproducing system 300 may include the functional features for performing power control of the reproducing unit 301 based on the reproduction purpose of content in addition to the functional features of the first embodiment.

Similarly, the content reproducing apparatus 200 may only include the position information acquisition unit 702 in addition to the functional elements of the first embodiment that are illustrated in FIG. 3, for example. In this case, the content reproducing system 300 may include the functional features for performing power control of the reproducing unit 301 based on position information of the content reproducing apparatus 200 in addition to the functional features of the first embodiment. For example, control operations may be implemented such that audio may be reproduced at a certain conference room but not at other conference rooms to maintain information confidentiality.

Further, the content reproducing apparatus 200 may only include the volume information acquisition unit 704 in addition to the functional elements of the first embodiment that are illustrated in FIG. 3, for example. In this case, the content reproducing system 300 may include the functional features for performing power control of the reproducing unit 301 based on volume information in addition to the functional features of the first embodiment. For example, in a case where content being reproduced is muted over a certain period even though the content includes an audio signal, the period during which the audio is muted may be set up as a non-reproduction period such that power conservation of the audio reproducing unit 307 may be achieved the next time the content is reproduced.

Further, the content reproducing apparatus 200 may only include the display language acquisition unit 703 in addition to the functional elements of the first embodiment that are illustrated in FIG. 3, for example. In this case, the content reproducing system 300 may include the functional features for performing power control of the reproducing unit 301 based on the display language setting in addition to the functional features of the first embodiment. For example, in a case where the display language is set to Japanese but the audio included in the content is in another language (foreign language) and the audio is muted when the content is reproduced, the period during which the audio included in the content is in another language may be set up as a non-reproduction period that does not require audio reproduction the next time the content is reproduced.

Note that the above-described embodiments and configurations are merely illustrative examples and are not intended to limit the scope of the present invention. For example, the content 708 and the reproduction history information 709 stored in the external device 219 may alternatively be stored in the content reproducing apparatus 200. Also, in some embodiments, the determination unit 707 may be included in the content reproducing apparatus 200.

According to an aspect of the present invention, a content reproducing apparatus includes a reproducing unit configured to reproduce content including audio and video, and a power control unit configured to perform power control of the reproducing unit based on a reproducing position of the content to be reproduced.

In this way, the content reproducing apparatus that reproduces content including audio and video may be capable of adaptively performing power saving control operations according to the substance of the content to be reproduced, for example.

Note that the content reproducing apparatus 200 of the above-described embodiments is an illustrative example of a content reproducing apparatus according to the present invention. The content reproducing unit 301 and the power control unit 302 are respectively illustrative examples of a reproducing unit and a power control unit according to the present invention.

Although the present invention has been described above with reference to certain illustrative embodiments, the present invention is not limited to these embodiments, and numerous variations and modifications may be made without departing from the scope of the present invention.

The present application is based on and claims the benefit of priority of Japanese Patent Application No. 2014-126226 filed on Jun. 19, 2014, the entire contents of which are hereby incorporated by reference.

What is claimed is:

1. A content reproducing apparatus comprising:
    a processor configured to:
        reproduce content including audio and video;
        perform power control of a reproducing unit based on a reproducing position of the content and non-reproduction period information indicating at least one of a period during which reproduction of the audio of the content is unnecessary and a period during which reproduction of the video of the content is unnecessary, and
        transmit and receive reproduction history information including the non-reproduction period information to/from an external device,
        wherein the reproduction history information includes at least one of purpose information indicating a utilization purpose of the content, position information indicating a position of the content reproducing apparatus, and display language information indicating a display language of the content; and
        wherein the processor or the external device is configured to determine the non-reproduction period information that is to be used for reproducing the content based on a plurality of sets of the reproduction history information that are stored in advance and pre-reproduction information including at least one of the purpose information, the position information, and the display language information.

2. The content reproducing apparatus as claimed in claim 1, wherein the processor is further configured to acquire the non-reproduction period information from a storage unit that stores the non-reproduction period information in advance or an external device that stores the non-reproduction period information in advance.

3. The content reproducing apparatus as claimed in claim 1, wherein the processor is further:
    configured to generate the non-reproduction period information of the content when the content is reproduced.

4. The content reproducing apparatus as claimed in claim 3, wherein
    the processor determines a period during which audio data included in the content corresponds to silence as a non-reproduction period of the audio; and
    the processor determines a period during which video data included in the content corresponds to a black screen as a non-reproduction period of the video.

5. The content reproducing apparatus as claimed in claim 1, wherein
    the processor is further configured to reproduce the audio included in the content;
    at a start of the period during which reproduction of the audio is unnecessary, the processor switches to a power saving mode in which power consumption is lower as compared to a case where the audio is reproduced; and
    at an end of the period during which reproduction of the audio is unnecessary, the processor switches to a normal mode that enables reproduction of the audio.

6. The content reproducing apparatus as claimed in claim 1, wherein
    the processor is further configured to reproduce the video included in the content;
    at a start of the period during which reproduction of the video is unnecessary, the processor switches to a power saving mode in which power consumption is lower as compared to a case where the video is reproduced; and
    at an end of the period during which reproduction of the video is unnecessary, the processor switches to a normal mode that enables reproduction of the video.

7. The content reproducing apparatus as claimed in claim 1, the processor is further configured to:
    acquire volume information of the content when the content is reproduced;
    wherein the reproduction history information includes information indicating a non-reproduction period based on the volume information acquired by the processor.

8. A content reproducing system comprising:
    a processor configured to:
        reproduce content including audio and video; and
        a storage unit configured to store in advance non-reproduction period information indicating at least one of a period during which reproduction of the audio of the content is unnecessary and a period during which reproduction of the video of the content is unnecessary; wherein the processor is further configured to:
            perform power control of a reproducing unit based on the non-reproduction period information that is stored in advance and a reproducing position of the content, and transmit and receive reproduction history information including the non-reproduction period information to/from an external device, wherein the reproduction history information includes at least one of purpose information indicating a utilization purpose of the content, position information indicating a position of the content reproducing apparatus, and display language information indicating a display language of the content; and wherein the processor or the external device is further configured to determine the non-reproduction period information that is to be used for reproducing the content based on a plurality of sets of the reproduction history information that are stored in advance and pre-reproduction information including at least one of the purpose information, the position information, and the display language information.

9. A content reproducing method implemented by a content reproducing system for reproducing content including audio and video, the content reproducing method comprising the steps of:

storing in advance non-reproduction period information indicating at least one of a period during which reproduction of the audio of the content is unnecessary and a period during which reproduction of the video of the content is unnecessary;

acquiring the non-reproduction period information upon reproducing the content; and performing power control of the content reproducing system based on the acquired non-reproduction period information and a reproducing position of the content, and transmitting and receive reproduction history information including the non-reproduction period information to/from an external device, wherein the reproduction history information includes at least one of purpose information indicating a utilization purpose of the content, position information indicating a position of the content reproducing apparatus, and display language information indicating a display language of the content; and wherein the method further includes determining the non-reproduction period information that is to be used for reproducing the content based on a plurality of sets of the reproduction history information that are stored in advance and pre-reproduction information including at least one of the purpose information, the position information, and the display language information.

* * * * *